(12) United States Patent
Nakata et al.

(10) Patent No.: US 7,317,675 B2
(45) Date of Patent: Jan. 8, 2008

(54) METHOD OF MANUFACTURING OPTICAL HEAD

(75) Inventors: Hideki Nakata, Soraku-gun (JP); Hironori Tomita, Ikoma (JP); Hideki Aikoh, Higashiosaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/428,564

(22) Filed: May 2, 2003

(65) Prior Publication Data
US 2003/0193866 A1 Oct. 16, 2003

Related U.S. Application Data

(63) Continuation of application No. 09/491,100, filed on Jan. 25, 2000, now Pat. No. 7,209,411.

(51) Int. Cl.
*G11B 7/00* (2006.01)
(52) U.S. Cl. ............................ 369/53.28; 369/44.12; 369/112.05
(58) Field of Classification Search ............ 369/44.23, 369/44.29, 44.37, 44.41, 53.23, 53.41, 44.14, 369/44.16, 44.22, 13–15, 247, 53.28, 53.37, 369/13.02, 44.12, 44.27, 112.01, 112.09, 369/121, 47.51, 112.29, 13.17, 13.21, 112.05; 359/814, 813, 823, 824; 360/59; 720/689
See application file for complete search history.

(56) References Cited

U.S. PATENT DOCUMENTS

| 4,185,913 | A | | 1/1980 | Ammann et al. ............... 355/43 |
| 4,596,444 | A | * | 6/1986 | Ushida ........................ 359/813 |
| 4,614,431 | A | | 9/1986 | Komeyama |
| 4,734,899 | A | * | 3/1988 | Van Sluys ................ 369/44.22 |
| 4,745,589 | A | | 5/1988 | Nomura .................... 369/44.16 |
| 4,959,820 | A | * | 9/1990 | Horimai et al. .......... 369/13.15 |
| 4,991,161 | A | | 2/1991 | Ikegame et al. ......... 369/44.15 |
| 5,005,162 | A | | 4/1991 | Mitsumori et al. ...... 369/44.12 |
| 5,091,793 | A | | 2/1992 | Gato et al. .................... 359/831 |
| 5,218,587 | A | * | 6/1993 | Nomiyama et al. ...... 369/44.16 |
| 5,237,557 | A | | 8/1993 | Kasahara et al. |
| 5,481,515 | A | | 1/1996 | Kando et al. ............. 369/44.12 |
| 5,541,908 | A | | 7/1996 | Hsu et al. ................. 369/44.19 |
| 5,581,524 | A | * | 12/1996 | Fujino ..................... 369/44.27 |
| 5,608,696 | A | * | 3/1997 | Makigaki ................. 369/44.14 |
| 5,615,053 | A | | 3/1997 | Toyama et al. ............. 359/813 |

(Continued)

FOREIGN PATENT DOCUMENTS

EP 252562 1/1998

(Continued)

*Primary Examiner*—Andrea Wellington
*Assistant Examiner*—Kim-Kwok Chu
(74) *Attorney, Agent, or Firm*—Hamre, Schumann, Mueller & Larson, P.C.

(57) ABSTRACT

An integrated unit in which a light source and a light emitting diode are combined into one component is fixed to an optical bench. Then, relative position adjustment of an objective lens actuator is carried out with respect to the optical bench so that a desired detection signal can be obtained through reflected light from a disk information recording medium and then the objective lens actuator is fixed. The relative position adjustment of the integrated unit is no longer required and it is no longer necessary preliminarily to provide a margin for adjusting the integrated unit. Thus, an optical head can be reduced in size and thickness.

7 Claims, 13 Drawing Sheets

U.S. PATENT DOCUMENTS

| | | | |
|---|---|---|---|
| 5,708,633 A | 1/1998 | Hollen et al. | 369/44.11 |
| 5,787,067 A * | 7/1998 | Song | 369/247 |
| 5,894,370 A | 4/1999 | Okuda et al. | |
| 5,920,532 A | 7/1999 | Yagi et al. | 369/53.22 |
| 5,946,146 A | 8/1999 | Haruguchi et al. | 359/824 |
| 5,982,564 A * | 11/1999 | Nagai | 359/814 |
| 5,986,983 A * | 11/1999 | Simpson et al. | 369/44.14 |
| 6,002,661 A | 12/1999 | Abe et al. | |
| 6,016,293 A | 1/2000 | Lee et al. | 369/44.25 |
| 6,044,048 A * | 3/2000 | Oinoue et al. | 369/44.23 |
| 6,246,644 B1 | 6/2001 | Seo | 369/44.23 |
| 6,310,852 B1 | 10/2001 | Tomita et al. | 369/44.15 |
| 6,445,671 B1 | 9/2002 | Takeda et al. | |
| 2004/0090881 A1 | 5/2004 | Nakata et al. | |

FOREIGN PATENT DOCUMENTS

| | | |
|---|---|---|
| JP | 58-179946 | 10/1983 |
| JP | 60-16321 | 2/1985 |
| JP | 60-20024 | 2/1985 |
| JP | 62-150728 | 9/1987 |
| JP | 63-50920 | 3/1988 |
| JP | 64-15317 | 1/1989 |
| JP | 1-97413 | 6/1989 |
| JP | 1-173434 | 7/1989 |
| JP | 01173434 | 7/1989 |
| JP | 01224720 | 9/1989 |
| JP | 01277330 | 11/1989 |
| JP | 3-147536 | 6/1991 |
| JP | 3-207027 | 9/1991 |
| JP | 6-131726 | 10/1992 |
| JP | 4-349221 | 12/1992 |
| JP | 5-135404 | 6/1993 |
| JP | 5-86111 | 11/1993 |
| JP | 5-314535 | 11/1993 |
| JP | 6-20285 | 1/1994 |
| JP | 7-6533 | 1/1995 |
| JP | 7-141691 | 6/1995 |
| JP | 7-201064 | 8/1995 |
| JP | 7-240035 | 9/1995 |
| JP | 8-36771 | 2/1996 |
| JP | 9-35322 | 2/1997 |
| JP | 9-231592 | 9/1997 |
| JP | 9-320086 | 12/1997 |
| JP | 10-320802 | 12/1998 |
| JP | 11-213411 | 8/1999 |
| JP | 11-339299 | 12/1999 |

* cited by examiner

METHOD OF MANUFACTURING OPTICAL HEAD

This application is a continuation of application Ser. No. 09/491,100, filed on Jan. 25, 2000 now U.S. Pat. No. 7,209,411, which application(s) are incorporated herein by reference.

FIELD OF THE INVENTION

The present invention relates to a method of manufacturing an optical head for a disk recording/reproducing apparatus using a system of optically recording or reproducing information by projecting a light spot on a disk recording medium.

BACKGROUND OF THE INVENTION

Recently, disk recording/reproducing apparatuses have been used for many applications, such as for DVDs, MDs, CDs, CD-ROMs, or the like, which have been diversified year after year. In addition, they have been increasingly improved in density, performance, quality and added value, and reduced in size. Particularly, in disk recording/reproducing apparatuses using recordable magneto-optical media, the demand for those used for data and picture recording tends to increase considerably, and further reductions in size and thickness and further improvement in performance and recording density have been requested.

Conventionally, many techniques relating to optical heads for magneto-optical disks have been reported.

As an example of a conventional disk recording/reproducing apparatus, an optical head for a magneto-optical disk is described with reference to drawings as follows.

FIGS. 10, 11, 12, and 13 are schematic structural views of a conventional optical head and views illustrating the principle of its operation.

In FIGS. 10, 11, 12, and 13, numeral 1 indicates a silicon substrate, numeral 2 a semiconductor laser fixed on the silicon substrate 1, numeral 3 a multisplit photodetector provided on the silicon substrate 1, numeral 4 a resin package, and numeral 5 a hologram element (a diffraction grating) formed of resin, numeral 6 a composite device including a beam splitter 6a, a return mirror 6b, and a polarization separation element 6c, numeral 8 a holder for maintaining an integrated unit 7 including the silicon substrate 1, the semiconductor laser 2, the multisplit photodetector 3, the package 4, the diffraction grating 5, and the composite device 6, numeral 9 a reflecting mirror, numeral 10 an objective lens fixed to an objective lens holder 11, numeral 12 a magneto-optical recording medium having a magneto-optical effect, numeral 13 an objective lens actuator for actuating the objective lens in a focus direction and a radial direction of the magneto-optical recording medium 12, numeral 14 a base as a component of the objective lens actuator 13, numeral 15 screws for tilting, numeral 16 an optical bench, numeral 17 light spots for detecting a focus error signal, which are formed on the multisplit photodetector 3, numeral 18 a light spot for detecting a tracking error signal, which is formed on the multisplit photodetector 3, numeral 19 a main beam (P-polarized light) formed on the multisplit photodetector 3, numeral 20 a main beam (S-polarized light) formed on the multisplit photodetector 3, numeral 21 light receiving areas for a focus error signal, numerals 22 and 23 light receiving areas for a tracking error signal, numeral 24 light receiving areas for an information signal, numeral 25 subtractors, numeral 26 an adder, numerals 27 and 28 focal points of the light spots for detecting a focus error signal.

With respect to the conventional example with the configuration as described above, its operation is described as follows.

A beam emitted from the semiconductor laser 2 is separated into a plurality of different beams of light by the hologram element 5. The plurality of different beams of light pass through the beam splitter 6a in the composite device 6, are reflected by the reflecting mirror 9, and then are focused on the magneto-optical recording medium 12 as a light spot 30 with a diameter of about 1 µm by the objective lens 10 fixed to the objective lens holder 11.

A beam of light reflected by the beam splitter 6a in the composite device 6 enters receiving optics for monitoring the laser (not shown in the figures) to control a driving current for the semiconductor laser 2.

Reflected light from the magneto-optical recording medium 12 travels along the reverse path to be reflected and separated by the beam splitter 6a in the composite device 6, which is incident on the return mirror 6b and then the polarization separation element 6c.

The semiconductor laser 2 is mounted so that the polarization direction is parallel to the surface of the paper in FIG. 11A. Incident light is separated into two beams of light whose polarized components are orthogonal to each other by the polarization separation element 6c, which are then incident on the light receiving areas 24 for an information signal.

Out of the reflected light from the information recording medium 12, a beam of light that has passed through the beam splitter 6a is separated into a plurality of beams of light by the diffraction grating 5, which are focused on the light receiving areas 21 for a focus error signal and the light receiving areas 22 and 23 for a tracking error signal.

Focus servo is operated by a so-called SSD (spot size detection) method and tracking servo by a so-called push-pull method.

Further, by calculating the difference between the main beam 19 composed of P-polarized light and the main beam 20 composed of S-polarized light, a magneto-optical disk information signal can be detected by a differential detection method. Furthermore, by calculating the sum of them, a prepit signal can be detected.

The reflecting mirror 9 is fixed to the optical bench 16. The integrated unit 7 is bonded and fixed to the holder 8, which is then fixed to a side face of the optical bench 16.

In the optical head with the configuration as described above, in order to obtain a desired detection signal through reflected light from the magneto-optical recording medium, the relative position adjustment of the semiconductor laser 2, the objective lens 10, and the multisplit photodetector 3 is carried out at the time of their assembly.

With respect to such relative position adjustment, in the above-mentioned conventional apparatus, the position of the multisplit photodetector 3 in a Z'-axis direction (an optical axis direction, see FIG. 10) is determined uniquely by specifying the sizes of the optical bench 16 and the holder 8 so that the light receiving plane is positioned approximately midway between the focal points 27 and 28 of light spots. A focus error signal and a tracking error signal are adjusted by maintaining the holder 8 with an external jig and moving the integrated unit 7 in an X direction and a Y direction (see FIG. 10) so that approximately equal outputs are obtained from the light receiving areas 22 and 23 for a tracking error signal.

On the other hand, the relative tilt between the magneto-optical recording medium 12 and the objective lens 10 is adjusted by so-called "spherical tilting" that is carried out by rotating the screws 15 for tilting to bring a spherical slide portion of the base 14 as a component of the objective lens actuator 13 and a spherical slide portion of the optical bench 16 into contact and then to allow the base 14 to pivot. In this case, the center of rotation is the principal point 10a of the objective lens 10. In FIGS. 10 and 13, θR indicates skew adjustment in a radial direction (the adjustment by the rotation about the Z'-axis) and θT indicates skew adjustment in a tangential direction (the adjustment by the rotation about the X-axis).

However, in the above-mentioned conventional configuration, the relative position adjustment of the semiconductor laser 2, the objective lens 10, and the multisplit photodetector 3 is carried out by moving the holder 8 maintaining the integrated unit 7 in the X-axis direction and the Y-axis direction. Therefore, it is necessary preliminarily to provide a margin for the adjustment. Particularly, the margin for the adjustment in the Y-axis direction leads directly to the increase in overall height (the height in the thickness direction of a magneto-optical recording medium) of the optical head.

Further, since the integrated unit 7 is minute, it is difficult to adjust its position individually. Therefore, it is necessary to adjust its position through the holder 8 maintaining the integrated unit 7. Consequently, the wall thickness of the holder 8 in the Y-axis direction also contributes to the increase in overall height of the optical head.

Thus, as long as the relative position adjustment of the semiconductor laser 2, the objective lens 10, and the multisplit photodetector 3 is carried out in the conventional configuration, the reduction in size and thickness of the optical head and the disk recording/reproducing apparatus is difficult, which has been a problem.

SUMMARY OF THE INVENTION

In view of the aforementioned conventional problem, the present invention is intended to provide a method of manufacturing an optical head, in which a small and thin optical head and disk recording/reproducing apparatus can be obtained by reducing the overall height of the optical head considerably through the use of a configuration in which the holder 8 is omitted by fixing the integrated unit 7 directly to the optical bench 16 and the spherical slide portions of the optical bench 16 and the base 14 are omitted.

In order to attain the aforementioned object, the present invention employs the following configuration.

The method of manufacturing an optical head of the present invention is directed to a method of manufacturing an optical head provided with an integrated unit in which a light source and a light emitting diode are combined into one component, an objective lens actuator for maintaining an objective lens as a means of focusing light onto a disk information recording medium and actuating the objective lens in a focus direction and a radial direction of the disk information recording medium, and an optical bench for maintaining the integrated unit and the objective lens actuator. The method is characterized in that the integrated unit is fixed to the optical bench and then the position of the objective lens actuator is adjusted relatively with respect to the optical bench or the integrated unit so that a desired detection signal can be obtained through reflected light from the disk information recording medium.

According to the above-mentioned configuration, in order to obtain a desired detection signal through reflected light from the disk information recording medium, the position of the objective lens actuator is adjusted relatively with respect to the optical bench or the integrated unit. Therefore, the position adjustment by moving the integrated unit as in the conventional example is no longer required. As a result, it is not necessary preliminarily to provide the margin for adjusting the integrated unit. In addition, the holder for maintaining the integrated unit is no longer necessary, which has been necessary in adjusting the position of the integrated unit in the conventional apparatus. Thus, the overall height of the optical head can be reduced, and therefore the optical head and the disk recording/reproducing apparatus can be decreased in size and thickness.

In the above configuration, it is preferable that the relative position adjustment of the objective lens actuator includes position adjustment in a plane approximately orthogonal to an axis of light entering the objective lens. Particularly, it is preferable that the relative position adjustment of the objective lens actuator includes position adjustment in the radial direction and/or a tangential direction of the disk information recording medium. According to such a preferable configuration, the relative position adjustment can be carried out easily.

In the above-mentioned configuration, it is preferable that the relative position adjustment of the objective lens actuator includes skew adjustment of the objective lens actuator for adjusting the relative angle between the disk information recording medium and the objective lens. According to such a preferable configuration, when the relative positions of the light source, the objective lens, and receiving optics are adjusted by moving the objective lens actuator, the relative angle between the disk information recording medium and the objective lens also can be adjusted simultaneously. Therefore, the adjustment by spherical tilting is no longer required, which has been carried out conventionally for adjusting the relative angle between the disk information recording medium and the objective lens. As a result, the configuration can be simplified and the size and thickness of the apparatus can be further reduced. In addition, the relative adjustment among the light source/receiving optics, the objective lens actuator, and the disk information recording medium can be carried out at the same time solely by the adjustment in the plane and the adjustment by the rotation of the objective lens actuator, thus simplifying adjustment steps.

In the above-mentioned configuration, it is preferable that the relative position adjustment of the objective lens actuator includes position adjustment of the objective lens actuator in the direction of an axis of light entering the objective lens. According to such a preferable configuration, offset of a focus error signal can be eliminated, thus providing an optical head that enables recording and reproduction to be carried out with high precision and low electricity requirements.

In the above-mentioned configuration, it also is preferable that the optical head further includes a mirror positioned between the light source and the objective lens actuator and after fixing the integrated unit to the optical bench, relative position adjustment of the mirror is carried out with respect to the optical bench or the integrated unit so that a desired detection signal can be obtained through reflected light from the disk information recording medium. According to such a configuration, the volume of relative position adjustment of the objective lens actuator can be reduced considerably, thus reducing the size and thickness of the optical head and the disk recording/reproducing apparatus.

In this case, it is preferable that the relative position adjustment of the mirror includes angle adjustment of an axis of reflected light from the mirror. According to such a preferable configuration, the volume of adjustment of the objective lens actuator in the radial direction and the tangential direction can be reduced considerably. Thus, the size and thickness of the apparatus can be further reduced.

Moreover, in the above-mentioned configuration, it is preferable that the relative position adjustment of the objective lens actuator includes adjustment by rotating the objective lens actuator about an approximate center of the objective lens in a plane approximately orthogonal to an axis of light entering the objective lens. Alternatively, it is preferable that the objective lens is adjusted by being rotated about the approximate center of the objective lens in a plane approximately orthogonal to the axis of light entering the objective lens. According to such preferable configurations, an astigmatic difference of the light source and astigmatism of the objective lens can be reduced by the in-plane rotation of the objective lens or the objective lens actuator, and therefore the recording/reproducing performance of the optical head is further improved, thus improving the performance of the disk recording/reproducing apparatus.

BRIEF DESCRIPTION OF THE DRAWINGS

FIG. 4A is a front view and FIG. 4B is a sectional view taken along line I-I in FIG. 4A and seen from the direction indicated with an arrow.

FIG. 8A is a front view and FIG. 8B is a sectional view taken along line II-II in FIG. 8A and seen from the direction indicated with an arrow.

FIG. 11A is a front view and FIG. 11B is a sectional view taken along line III-III in FIG. 11A and seen from the direction indicated with an arrow.

DETAILED DESCRIPTION OF THE INVENTION

Figure 1:
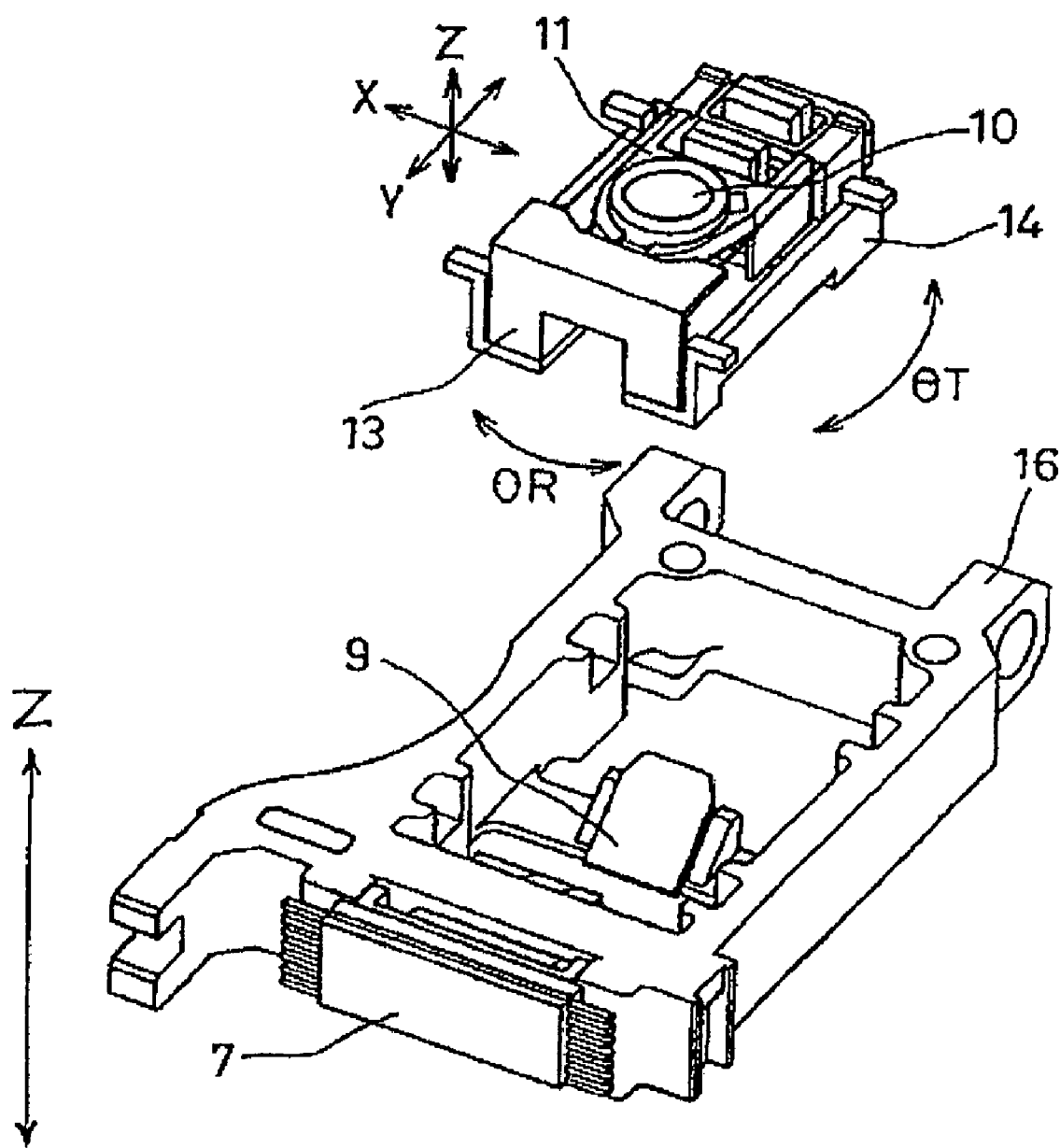
FIG. 1 is an exploded perspective view showing a method of adjusting an objective lens actuator in an optical head according to a first embodiment of the present invention.
Figure 2:
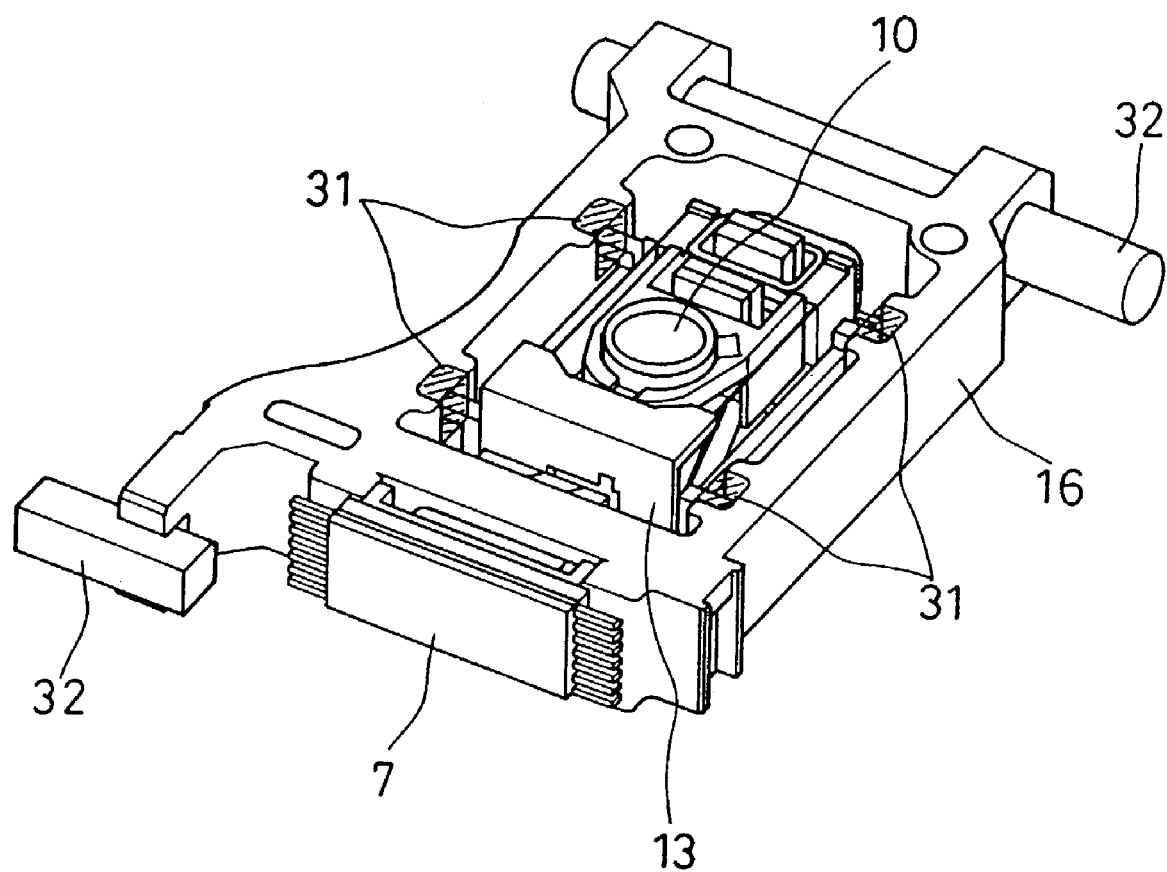
FIG. 2 is a schematic perspective view showing the whole configuration in an assembled state of the optical head according to the first embodiment of the present invention.
Figure 3:
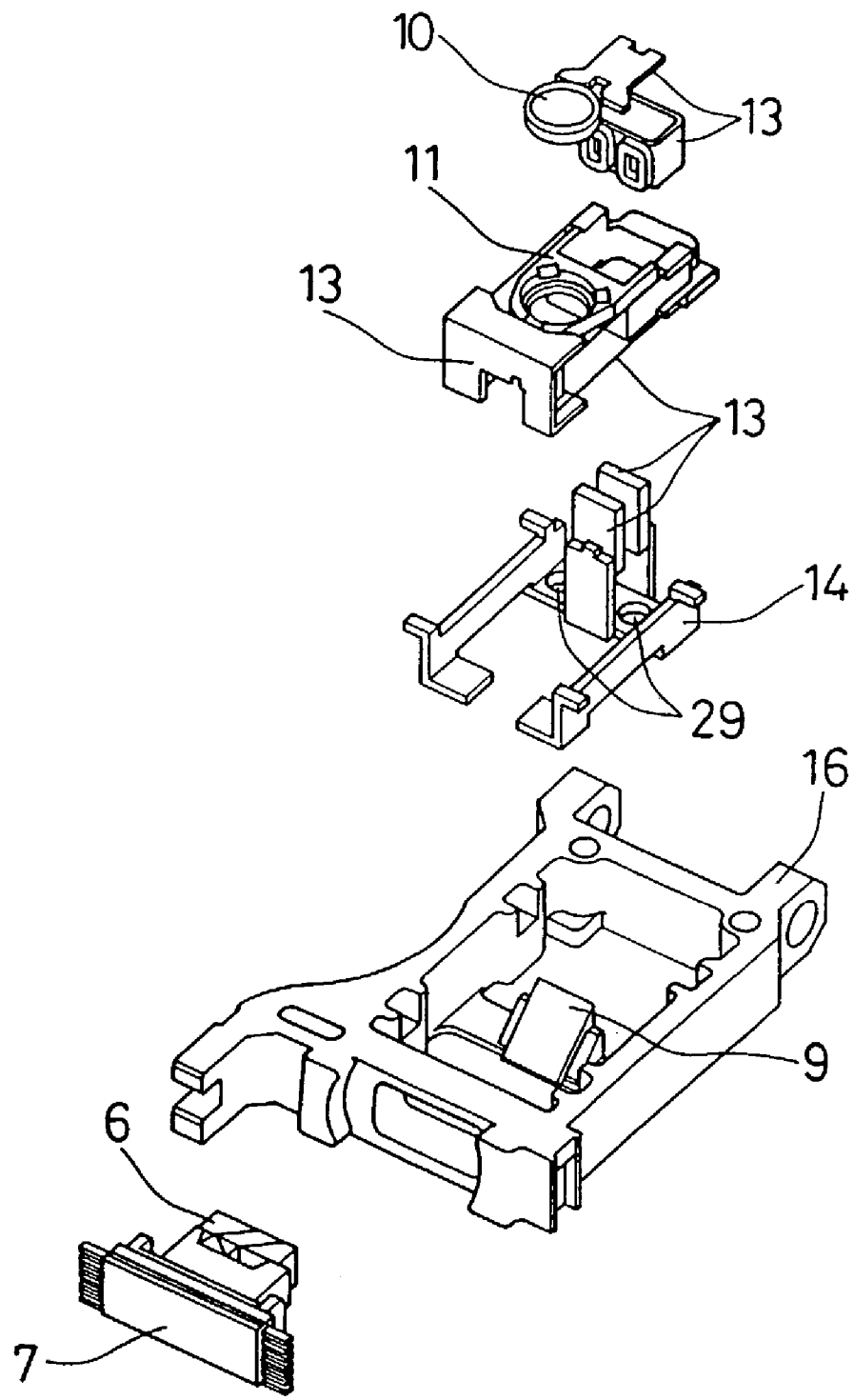
FIG. 3 is an exploded perspective view showing a schematic configuration of the optical head according to the first embodiment of the present invention.
Figure 4:
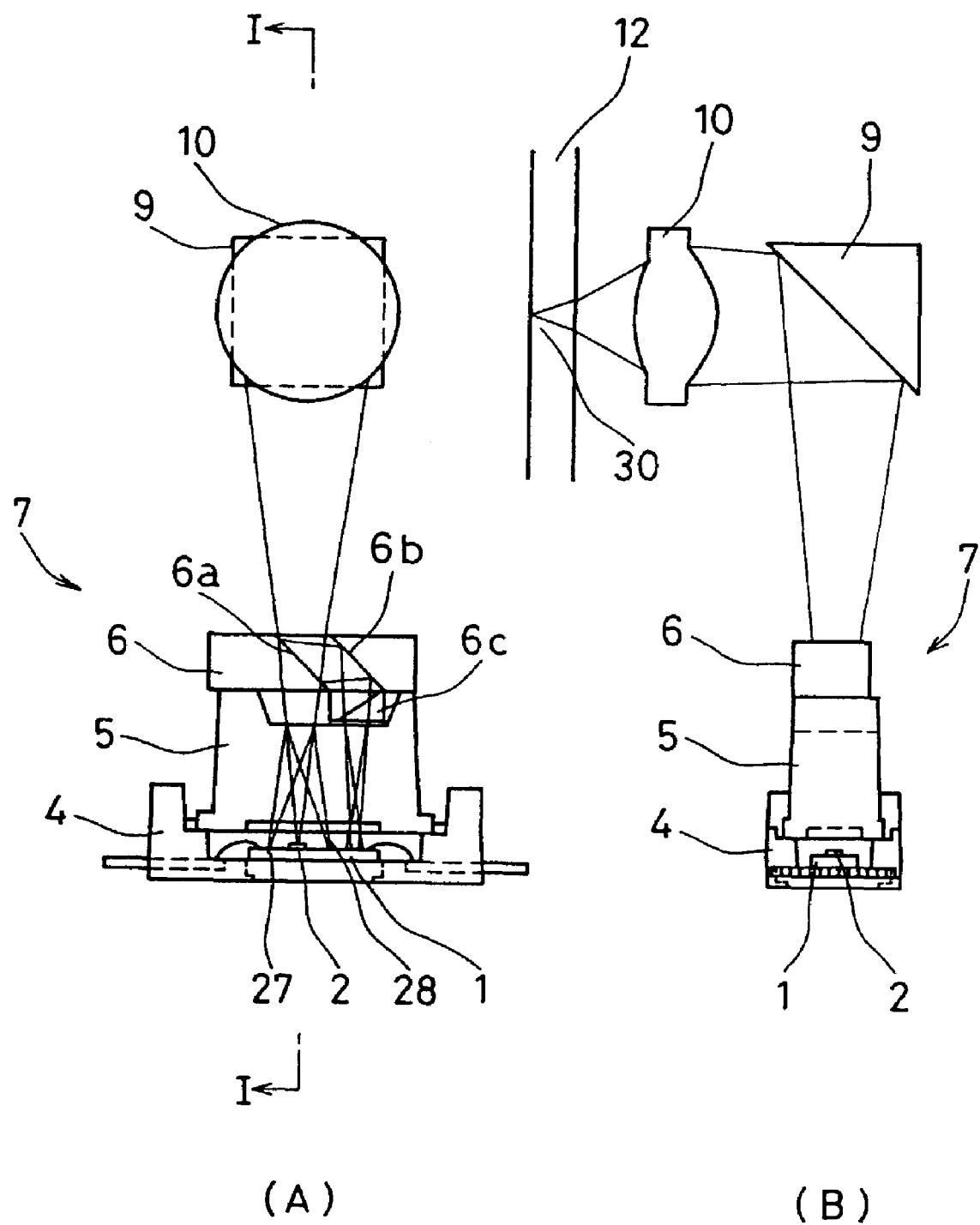
FIG. 4 shows schematic views illustrating optical paths in the optical head according to the first embodiment of the present invention.
Figure 5:
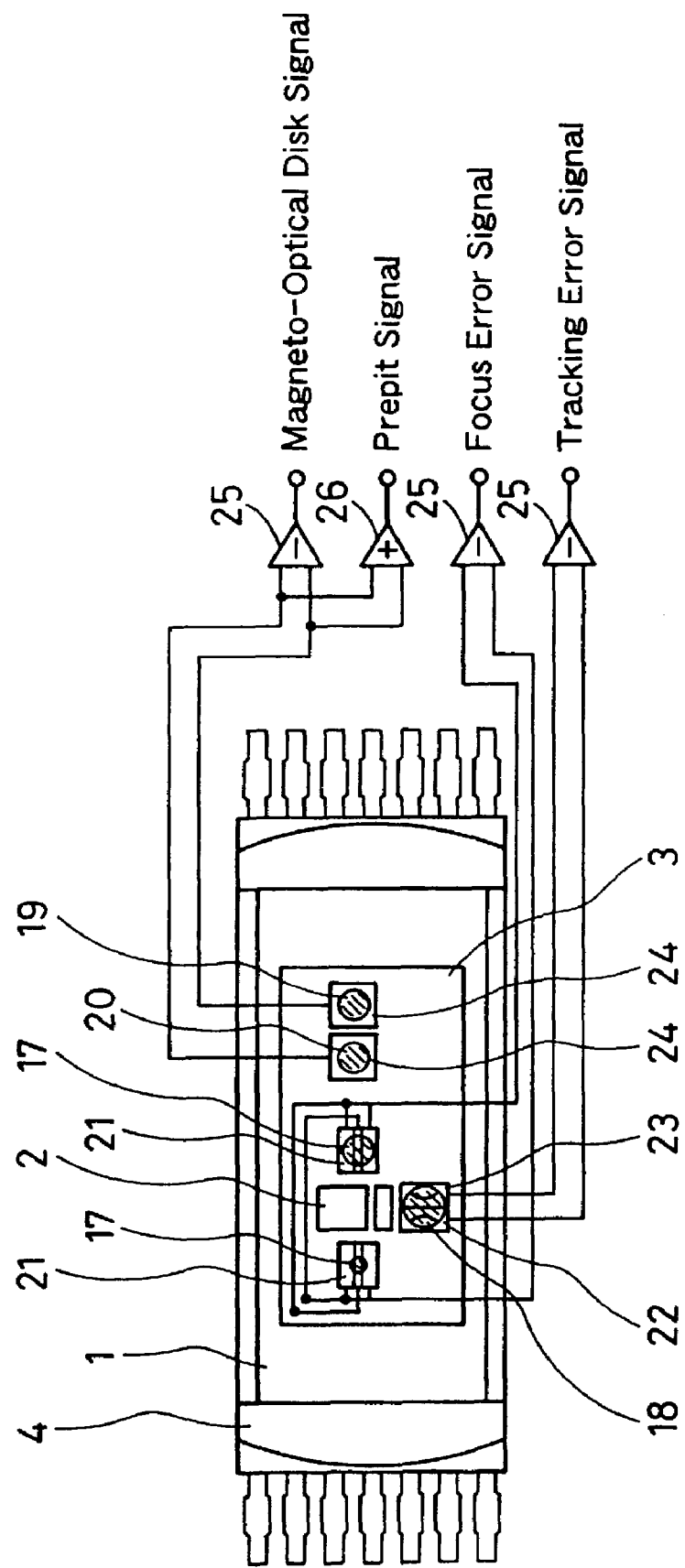
FIG. 5 is a schematic view showing a multisplit photodetector and a signal detection circuit used in the optical head according to the first embodiment of the present invention.

The present invention is described in detail using the drawings as follows.

FIRST EMBODIMENT

A first embodiment of the present invention is described with reference to the drawings as follows.

In FIGS. 1, 2, 3, 4, and 5, numeral 1 indicates a silicon substrate, numeral 2 a semiconductor laser fixed on the silicon substrate 1, numeral 3 a multisplit photodetector provided on the silicon substrate 1, numeral 4 a resin package, and numeral 5 a hologram element (a diffraction grating) formed of resin. The semiconductor laser 2, the multisplit photodetector 3, and the hologram element 5 are fixed to the resin package 4 with high precision. Numeral 6 denotes a composite device including a beam splitter 6a, a return mirror 6b, and a polarization separation element 6c. Numeral 9 represents a reflecting mirror, numeral 10 an objective lens fixed to an objective lens holder 11, numeral 12 a magneto-optical recording medium having a magneto-optical effect, numeral 13 an objective lens actuator for actuating the objective lens in a focus direction and a radial direction of the magneto-optical recording medium 12, numeral 14 a base as a component of the objective lens actuator 13, numeral 16 an optical bench, numeral 17 light spots for detecting a focus error signal, which are formed on the multisplit photodetector 3, numeral 18 a light spot for detecting a tracking error signal, which is formed on the multisplit photodetector 3, numeral 19 a main beam (P-polarized light) formed on the multisplit photodetector 3, numeral 20 a main beam (S-polarized light) formed on the multisplit photodetector 3, numeral 21 light receiving areas for a focus error signal, numerals 22 and 23 light receiving areas for a tracking error signal, numeral 24 light receiving areas for an information signal, numeral 25 subtractors, numeral 26 an adder, numerals 27 and 28 focal points of the light spots for detecting a focus error signal, numeral 29 positioning holes, numeral 31 adhesives, and numeral 32 guide axes.

With respect to the first embodiment of the present invention with the configuration as described above, its operation is described as follows.

A beam emitted from the semiconductor laser 2 is separated into a plurality of different beams of light by the hologram element 5. The plurality of different beams of light pass through the beam splitter 6a in the composite device 6, are reflected by the reflecting mirror 9, and then are focused on the magneto-optical recording medium 12 as a light spot 30 with a diameter of about 1 µm by the objective lens 10 fixed to the objective lens holder 11.

A beam of light reflected by the beam splitter 6a in the composite device 6 enters receiving optics for monitoring the laser (not shown in the figures) to control a driving current for the semiconductor laser 2.

Reflected light from the magneto-optical recording medium 12 travels along the reverse path to be reflected and separated by the beam splitter 6a in the composite device 6, which is incident on the return mirror 6b and then the polarization separation element 6c.

The semiconductor laser 2 is mounted so that the polarization direction is parallel to the surface of the paper in FIG. 4A. Incident light is separated into two beams of light whose polarized components are orthogonal to each other by the polarization separation element 6c, which are then incident on the light receiving areas 24 for an information signal.

Out of the reflected light from the information recording medium 12, a beam of light that has passed through the beam splitter 6a is separated into a plurality of beams of light by the diffraction grating 5, which are focused on the light receiving areas 21 for a focus error signal and the light receiving areas 22 and 23 for a tracking error signal.

Focus servo is operated by a so-called SSD method and tracking servo by a so-called push-pull method.

Further, by calculating the difference between the main beam 19 composed of P-polarized light and the main beam 20 composed of S-polarized light, a magneto-optical disk information signal can be detected by a differential detection method. Furthermore, by calculating the sum of them, a prepit signal can be detected.

The reflecting mirror 9 is fixed to the optical bench 16. An integrated unit 7 is fitted into the optical bench 16 to be fixed. Therefore, the size of the optical bench 16 is specified so that with respect to the position of the multisplit photodetector 3 in a Z'-axis direction (an optical axis direction), its light receiving plane is positioned approximately midway between the focal points 27 and 28 of light spots.

In the present embodiment, for the purpose of obtaining a desired detection signal through reflected light from the magneto-optical recording medium, the relative position adjustment of the semiconductor laser 2, the objective lens 10, and the multisplit photodetector 3 is carried out as follows.

The positioning holes 29 of the base 14 are engaged by chucking pins (not shown in the figures) of an external jig, and the objective lens actuator 13 is moved in an X direction (a radial direction) and in a Y direction (a tangential direction) in a plane approximately orthogonal to an axis of light entering the objective lens, thus carrying out the adjustment so that approximately equal outputs are obtained from the light receiving areas 22 and 23 for a tracking error signal. After the adjustment, the base 14 in the state thus obtained is bonded and fixed to the optical bench 16 using the adhesives 31. Thus, the adjustment of the focus error signal and the tracking error signal is completed.

In this case, it goes without saying that the same effect can be obtained by pre-bonding and pre-fixing the base 14 to the optical bench 16 and fixing the objective lens actuator 13 to the base 14 after the adjustment of the objective lens actuator 13 in the X and Y directions with respect to the base 14.

In adjusting the objective lens actuator in the plane approximately orthogonal to an axis of light entering the objective lens as described above, skew adjustment of the objective lens actuator 13 can be carried out to adjust the relative angle between the magneto-optical recording medium 12 and the objective lens at the same time. In other words, by using the same jig as the one described above and rotating the external jig, the objective lens actuator 13 is rotated to be adjusted in the radial direction (about a Y axis) θR and in the tangential direction (about an X axis) θT, respectively. In this case, it is preferable that the objective lens actuator 13 rotates about the principal point of the objective lens 10.

As described above, according to the first embodiment, the integrated unit 7 is fixed directly to the optical bench 16 and thus the holder is omitted. The objective lens actuator 13 is moved to be adjusted in the radial direction (the X direction) and the tangential direction (the Y direction), thus carrying out the adjustment of the focus error signal and the tracking error signal. As a result, a margin for the adjustment is not required in the height direction of the optical head, and the thickness of the optical head can be reduced by the wall thickness of the holder. Therefore, the overall height of the optical head can be reduced considerably, thus attaining the small and thin optical head and disk recording/reproducing apparatus.

In addition, since the skew adjustment of the objective lens actuator 13 for adjusting the relative angle between the magneto-optical recording medium 12 and the objective lens is carried out at the same time, the conventional adjustment by spherical tilting is no longer necessary. Therefore, the configuration can be simplified, thus further reducing the size and thickness of the apparatus. Moreover, the relative adjustment among the light source/receiving optics, the objective lens actuator, and the disk information recording medium is completed by carrying out the adjustment in a plane and the adjustment by the rotation of the objective lens actuator simultaneously, thus simplifying adjustment steps.

SECOND EMBODIMENT

Figure 6:
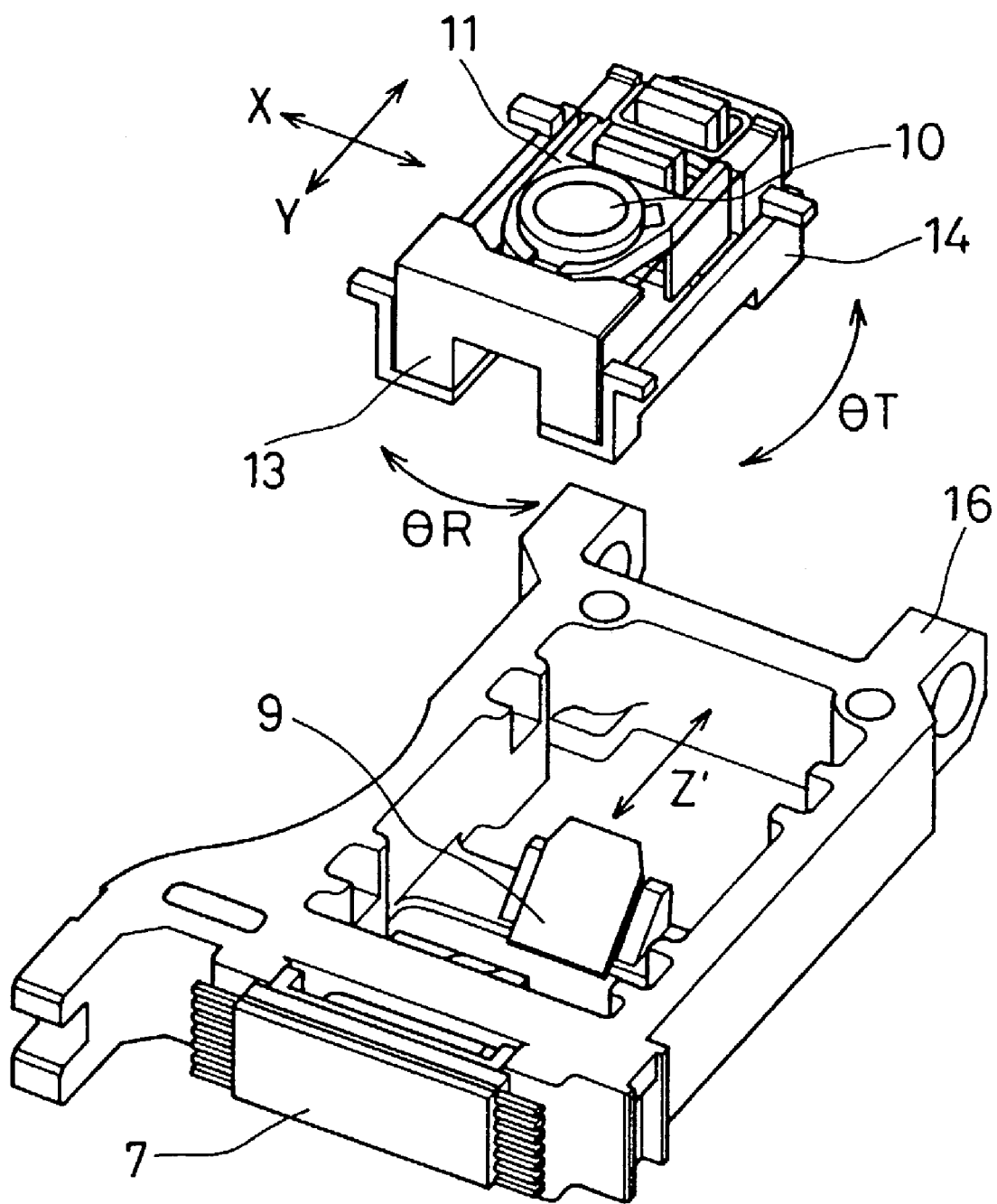
FIG. 6 is an exploded perspective view showing a method of adjusting an objective lens actuator and a reflecting mirror in an optical head according to a second embodiment of the present invention.

Next, a second embodiment is described with reference to FIG. 6.

The present embodiment is different from the first embodiment in that the adjustment of a base 14 in a Y direction (a tangential direction) is achieved by the adjustment of a reflecting mirror 9 in a Z' direction.

According to this configuration, the volume of adjustment of an objective lens actuator 13 and the base 14 in the Y direction (the tangential direction) can be reduced considerably, thus further reducing the size of the optical head.

THIRD EMBODIMENT

Figure 7:
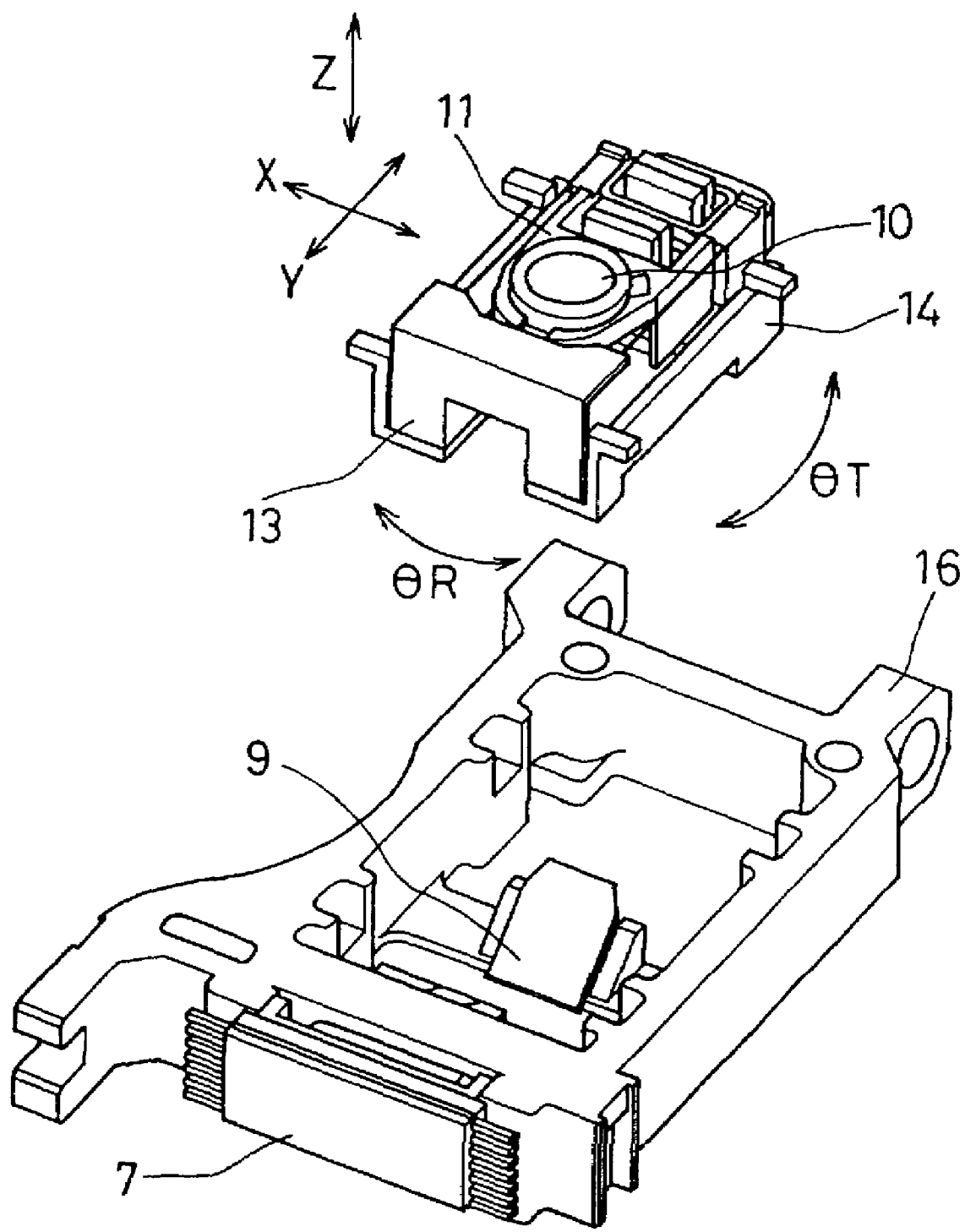
FIG. 7 is an exploded perspective view showing a method of adjusting an objective lens actuator in an optical head according to a third embodiment of the present invention.

Next, a third embodiment is described with reference to FIG. 7.

The present embodiment is different from the first embodiment in that a base 14 also is adjusted in a Z direction (in a direction of an axis of incident light, the height direction). According to this configuration, offset of a focus error signal can be eliminated, thus enabling recording and reproduction with high precision and low electricity.

FOURTH EMBODIMENT

Figure 8:
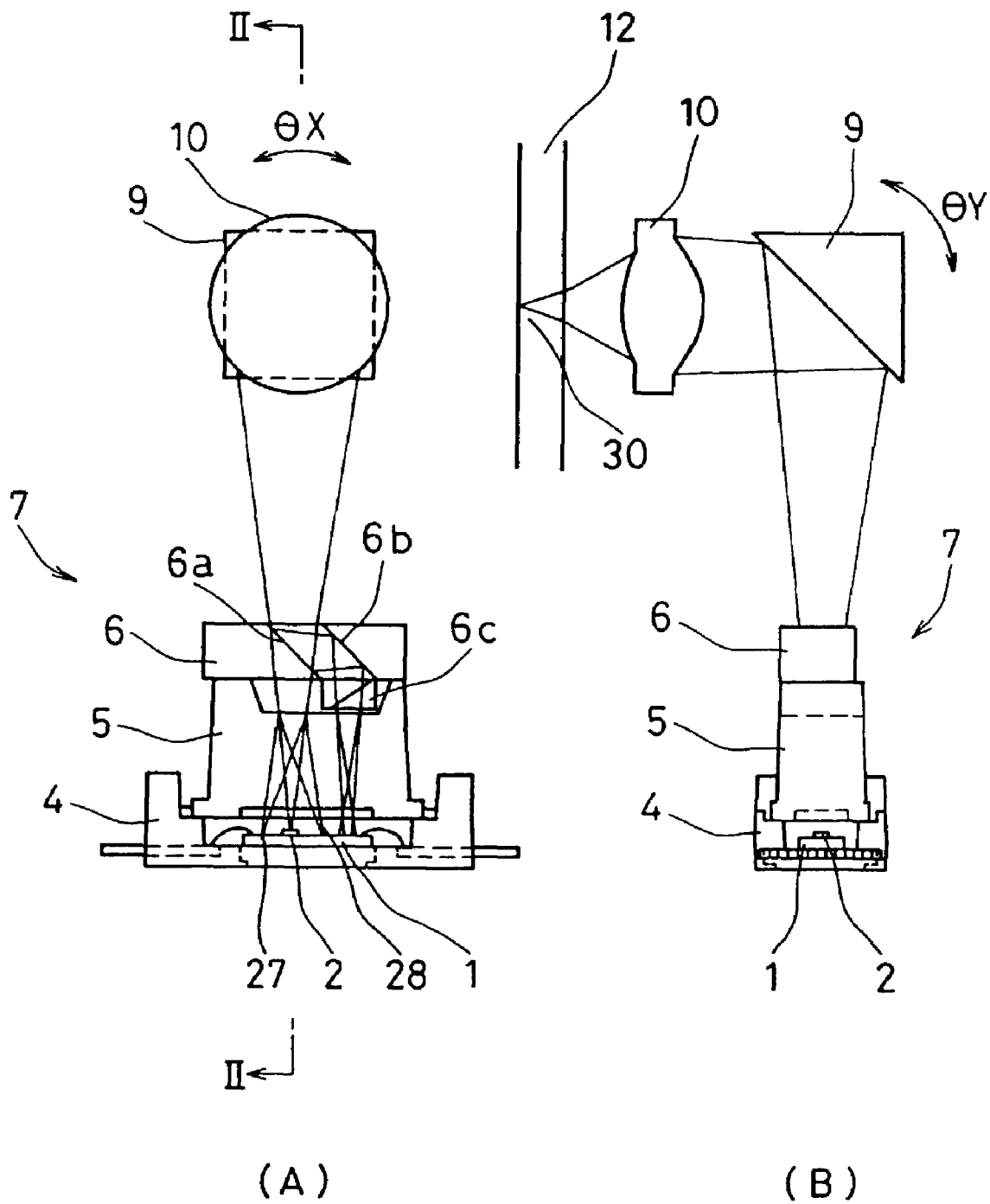
FIG. 8 shows schematic views illustrating a method of adjustment by rotation of a reflecting mirror in an optical head according to a fourth embodiment of the present invention.

Next, a fourth embodiment is described with reference to FIG. 8.

The present embodiment is different from the first embodiment in that the adjustment of a base 14 in an X direction (a radial direction) and a Y direction (a tangential direction) can be achieved by angle adjustment θX and θY of the reflection plane of a reflecting mirror 9. In this case, the center of rotation in adjusting the angle of the reflection plane is the approximate emission point of a semiconductor laser 2.

According to this configuration, the volume of adjustment of an objective lens actuator 13 in the radial direction and the tangential direction can be reduced considerably, thus further reducing the size of the optical head.

FIFTH EMBODIMENT

Figure 9:
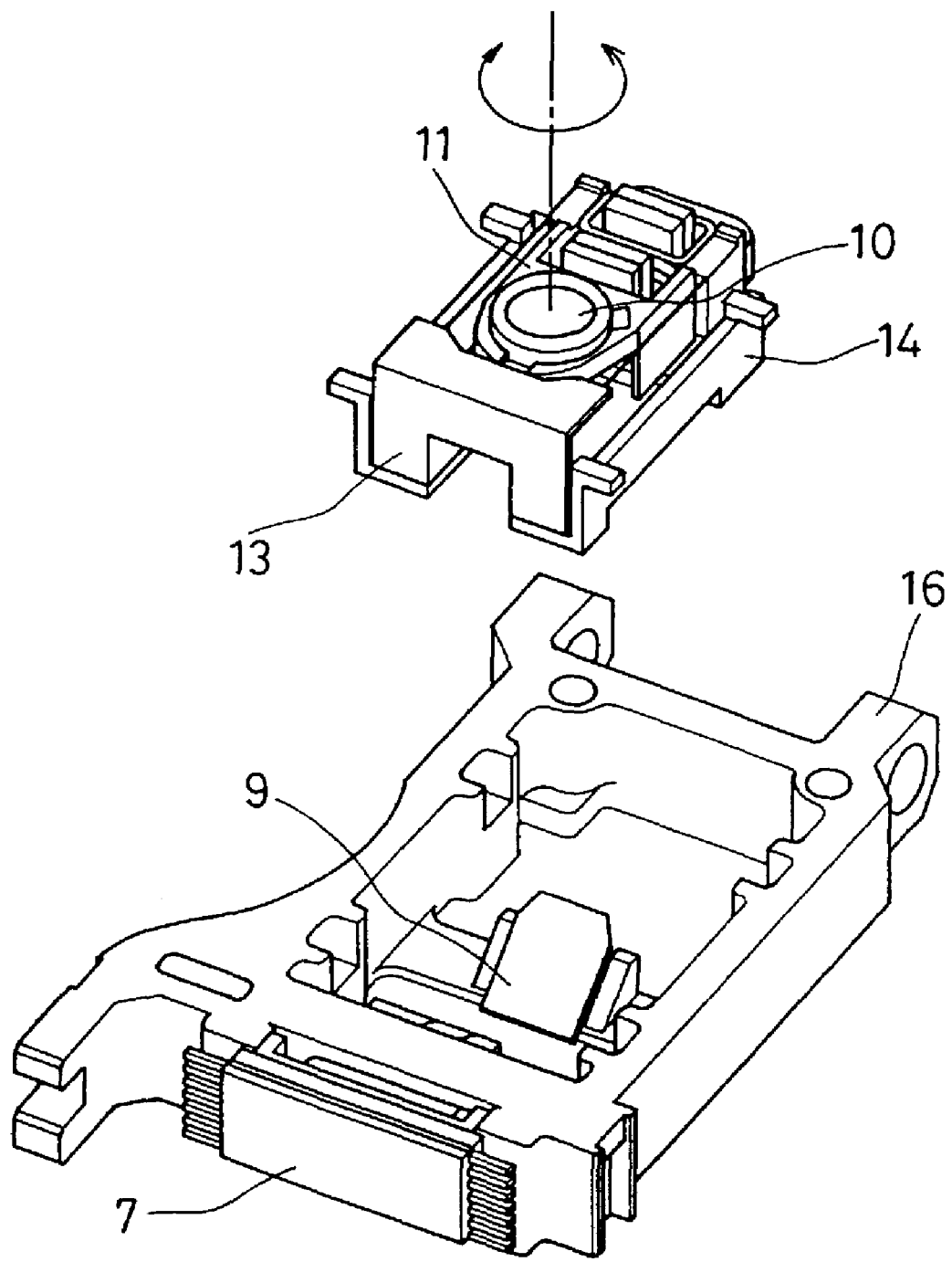
FIG. 9 is an exploded perspective view showing a method of adjustment by rotation of an objective lens in an optical head according to a fifth embodiment of the present invention.
Figure 10:
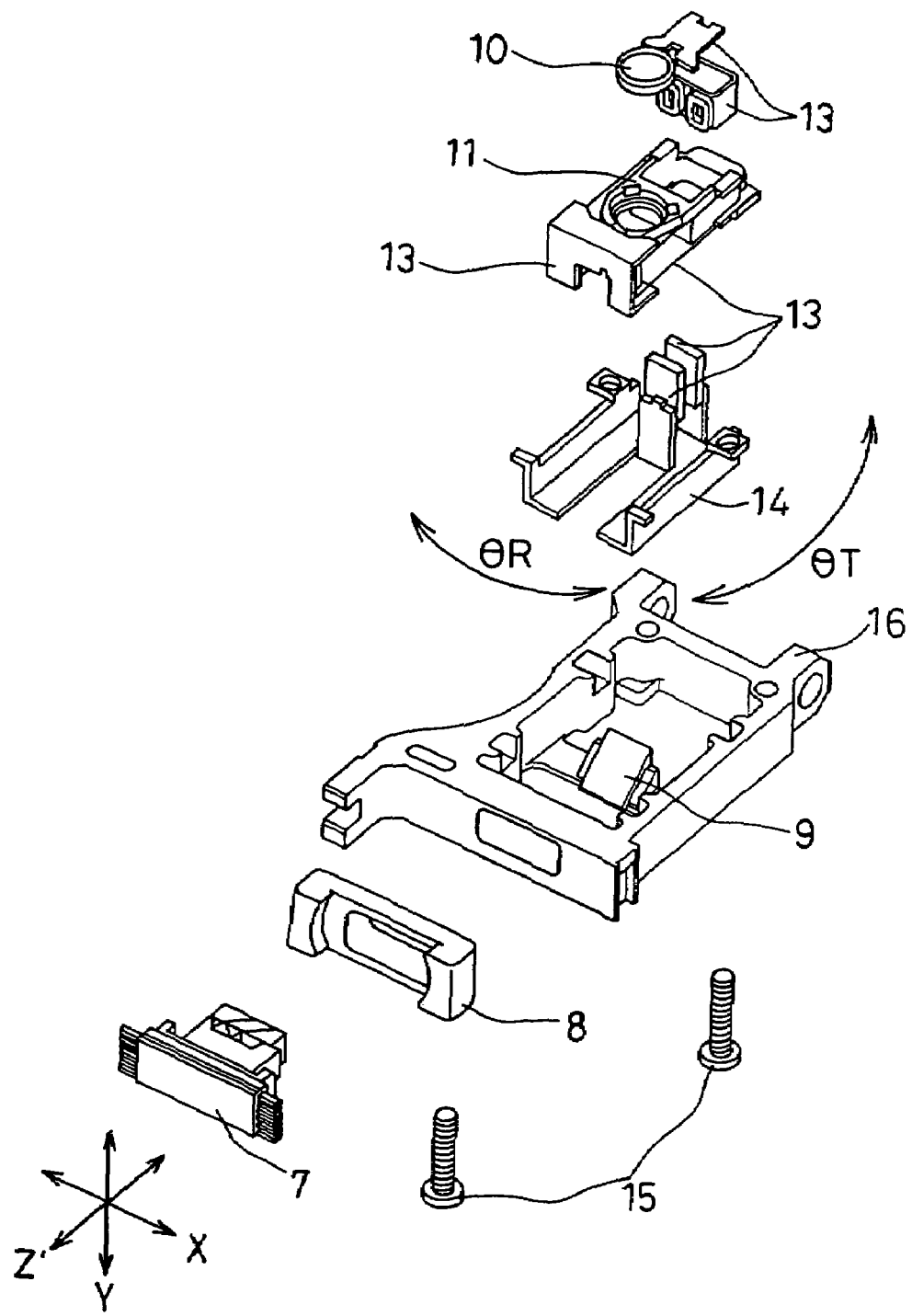
FIG. 10 is an exploded perspective view showing a schematic configuration and an adjustment method of a conventional optical head.
Figure 11:
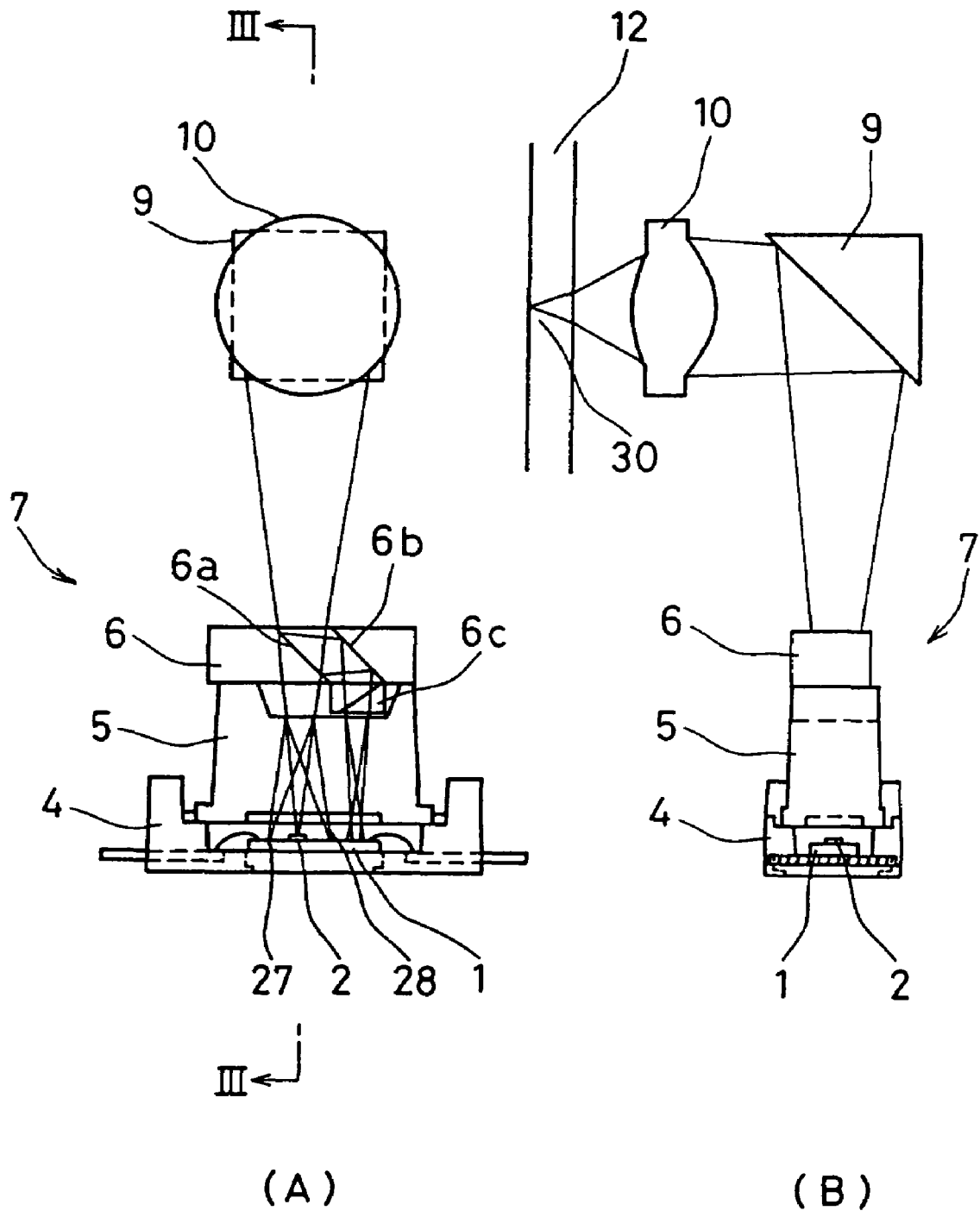
FIG. 11 shows schematic views illustrating optical paths in the conventional optical head.
Figure 12:
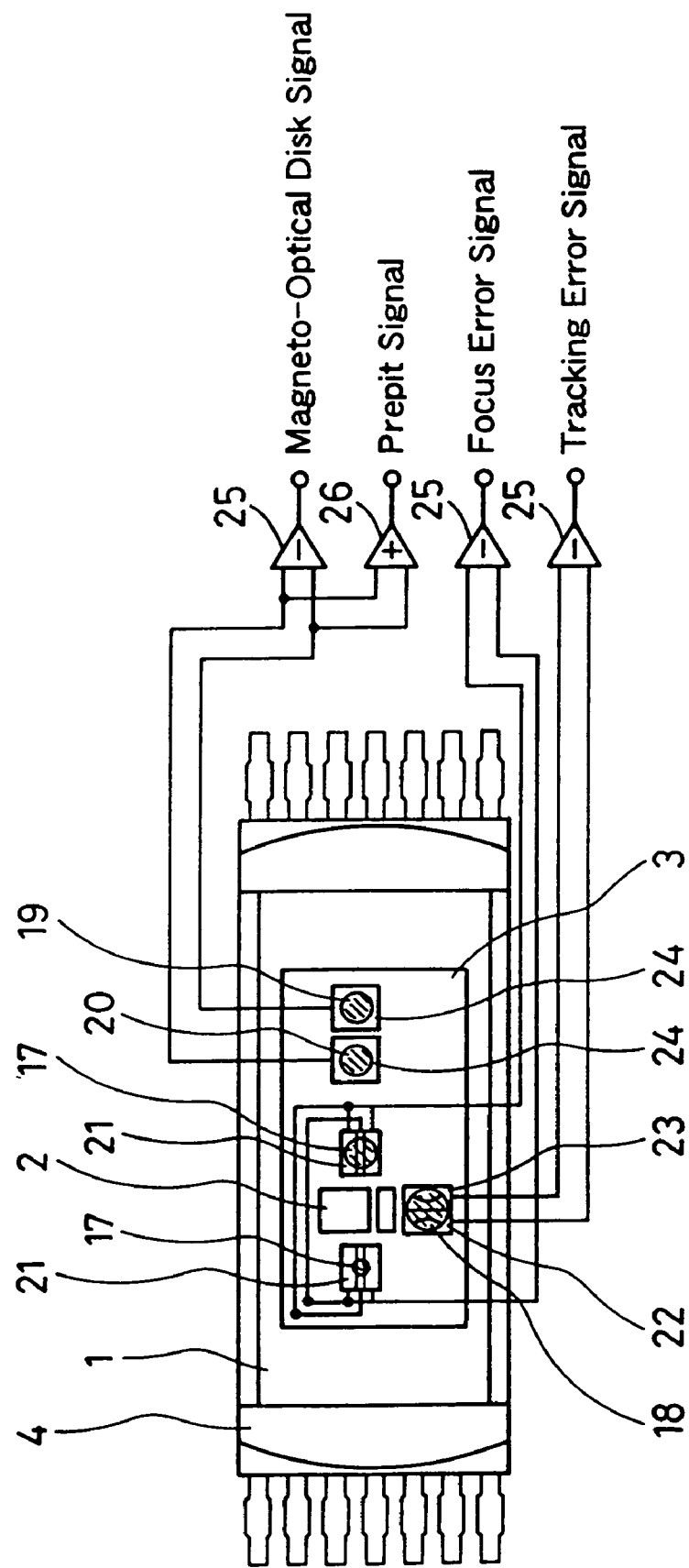
FIG. 12 is a schematic view showing a multisplit photodetector and a signal detection circuit used in the conventional optical head.
Figure 13:
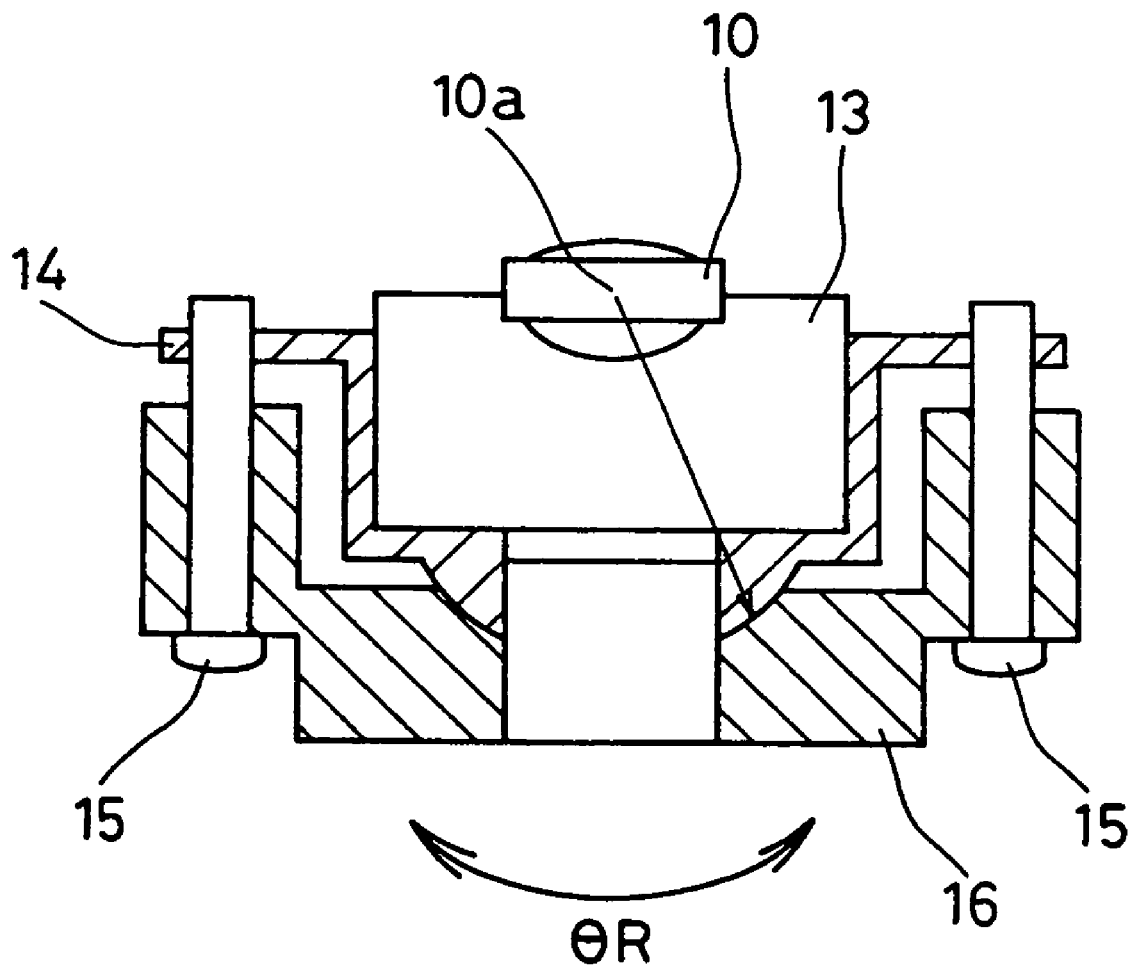
FIG. 13 is a schematic sectional view showing a mechanism of skew adjustment in the conventional optical head.

Next, a fifth embodiment is described with reference to FIG. 9.

The present embodiment is different from the first embodiment in that an objective lens 10, an objective lens actuator 13, or a base 14 is adjusted by being rotated about an approximate center (preferably the principal point) of the objective lens 10 in a plane approximately orthogonal to an axis of light entering the objective lens.

According to this configuration, an astigmatic difference of a semiconductor laser 2 and astigmatism of the objective lens 10 can be reduced by the in-plane rotation of the objective lens 10, and therefore the recording/reproducing performance of the optical head is further improved, thus improving the performance of the disk recording/reproducing apparatus.

The embodiments described above are intended merely to indicate technical contents of the present invention and the present invention should not be understood as being limited to such embodiments. The present invention may be embodied by making various modifications within the scope described in the claims and the spirit of the present invention and should be interpreted broadly.

What is claimed is:

1. A method of manufacturing an optical head comprising an integrated unit in which a light source and a photodetector are combined into one component, an objective lens actuator for maintaining an objective lens as a means of focusing light onto a disk information recording medium and actuating the objective lens in a focus direction and a radial direction of the disk information recording medium, and an optical bench for maintaining the integrated unit and the objective lens actuator, the objective lens actuator comprising the objective lens, an objective lens holder for maintaining the objective lens, a suspension for maintaining the objective lens holder, a base for supporting the suspension, a coil fixed to the objective lens holder, and a yoke fixed to the base, the objective lens holder being actuated in the focus direction and the radial direction by energizing the coil, the method comprising:

fixing the integrated unit to the optical bench to set an optical axis of the light source and the photodetector; and then subsequent to fixing the integrated unit, moving the objective lens actuator integrally with the base with respect to the optical bench or the integrated unit in a plane approximately orthogonal to an axis of light entering the objective lens so that a desired detection signal can be obtained through reflected light from the disk information recording medium; and then subsequent to moving the objective lens actuator, bonding and fixing the base to the optical bench.

2. The method of manufacturing an optical head according to claim 1, wherein the relative position adjustment of the objective lens actuator comprises position adjustment in a plane approximately orthogonal to an axis of light entering the objective lens.

3. The method of manufacturing an optical head according to claim 1, wherein the relative position adjustment of the objective lens actuator comprises position adjustment in the radial direction and/or a tangential direction of the disk information recording medium.

4. The method of manufacturing an optical head according to claim 1, wherein the relative position adjustment of the objective lens actuator comprises skew adjustment of the objective lens actuator for adjusting a relative angle between the disk information recording medium and the objective lens.

5. The method of manufacturing an optical head according to claim 1, wherein the relative position adjustment of the objective Lens actuator comprises position adjustment of the objective lens actuator in a direction of an axis of light entering the objective lens.

6. The method of manufacturing an optical head according to claim 1, wherein the optical head further comprises a mirror positioned between the light source and the objective lens actuator, and after fixing the integrated unit to the optical bench, relative position adjustment of the mirror is carried out with respect to the optical bench or the integrated unit so that a desired detection signal can be obtained through reflected light from the disk information recording medium.

7. The method of manufacturing an optical head according to claim 6, wherein the relative position adjustment of the mirror comprises angle adjustment of an axis of reflected light from the minor.

* * * * *

UNITED STATES PATENT AND TRADEMARK OFFICE
CERTIFICATE OF CORRECTION

| | |
|---|---|
| PATENT NO. | : 7,317,675 B2 |
| APPLICATION NO. | : 10/428564 |
| DATED | : January 8, 2008 |
| INVENTOR(S) | : Nakata et al. |

It is certified that error appears in the above-identified patent and that said Letters Patent is hereby corrected as shown below:

Column 10, Line 29 (Claim 5): "Lens" should read --lens--.

Signed and Sealed this

Twenty-third Day of December, 2008

JON W. DUDAS
*Director of the United States Patent and Trademark Office*